(12) United States Patent
Xiao (10) Patent No.: US 12,286,815 B2
(45) Date of Patent: Apr. 29, 2025

(54) LED DISPLAY SCREEN LOCK (71) Applicant: UNILUMIN GROUP CO., LTD, Shenzhen (CN)

(72) Inventor: Yulong Xiao, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 246 days.

(21) Appl. No.: 17/943,436

(22) Filed: Sep. 13, 2022

(65) Prior Publication Data

US 2023/0003050 A1    Jan. 5, 2023

Related U.S. Application Data (63) Continuation of application No. PCT/CN2020/126636, filed on Nov. 5, 2020.

(30) Foreign Application Priority Data

Apr. 3, 2020    (CN) .......................... 202020483240.2

(51) Int. Cl.
*E05B 63/00*    (2006.01)

(52) U.S. Cl.
CPC ................ *E05B 63/0017* (2013.01)

(58) Field of Classification Search
CPC ..... E05C 1/06; E05C 5/00; E05C 5/02; E05B 2001/0076; E05B 17/2019; E05B 17/203; E05B 17/2038; E05B 17/2057; E05B 15/0053; E05B 15/006; E05B 35/008; E05B 65/0057; E05B 65/006; G09F 9/33; F16B 21/16; Y10T 292/0969; Y10T 292/097; Y10T 292/0994; Y10T 292/1028; Y10T 292/1089; Y10T 292/57; Y10T 292/20;

(Continued)

(56) References Cited

U.S. PATENT DOCUMENTS

| 301,804 | A | * | 7/1884 | Chèvremont | ......... E05B 13/002 |
| | | | | | 292/DIG. 20 |
| 1,321,214 | A | * | 11/1919 | Karasevicz | ............... E05C 5/00 |
| | | | | | 292/67 |

(Continued)

FOREIGN PATENT DOCUMENTS

| CN | 203308254 U | * | 11/2013 | ............. E05C 19/00 |
| CN | 203603637 U | * | 5/2014 | ............... E05C 1/06 |

(Continued)

OTHER PUBLICATIONS

CN 203603637 Espacenet machine translation of description and claims (Year: 2024).*

(Continued)

*Primary Examiner* — Nicholas L Foster
*Assistant Examiner* — Steven A Tullia
(74) *Attorney, Agent, or Firm* — Westbridge IP LLC (57) ABSTRACT

An LED display screen lock includes a handle, a lock seat and a lock core. The lock seat includes a base, a through hole and a pin slidably disposed on the base. The lock core is rotatably disposed on the handle and received in the through hole. A locking hole is formed on the lock core and the pin is inserted in the locking hole. An unlocking portion is disposed on a circumference of the handle. The unlocking portion is abutted against the pin, in order to drive the pin to exit the locking hole.

12 Claims, 6 Drawing Sheets

(58) Field of Classification Search
CPC ............. Y10T 292/202; Y10T 292/218; Y10T 292/221; Y10T 292/225; Y10T 292/0863; Y10T 292/0864; Y10T 292/098; Y10T 292/0982; Y10T 292/96; B65D 45/02; B65D 45/025; B65D 45/16; B65D 45/20; B65D 45/24

See application file for complete search history.

(56) References Cited

U.S. PATENT DOCUMENTS

| | | | | |
|---|---|---|---|---|
| 1,396,478 | A * | 11/1921 | Turney | E05B 65/0864 292/57 |
| 1,541,093 | A * | 6/1925 | Amico | E05C 1/04 292/57 |
| 1,597,837 | A * | 8/1926 | Staley | B60J 1/2097 292/57 |
| 1,768,326 | A * | 6/1930 | Miller | E05C 17/446 292/164 |
| 2,038,827 | A * | 4/1936 | Carvette | E05B 65/0864 292/179 |
| 2,912,845 | A * | 11/1959 | Mordovanecy | E05B 17/2057 70/125 |
| 3,136,571 | A * | 6/1964 | Johnson | E05C 1/14 292/173 |
| 3,206,956 | A * | 9/1965 | Trammell, Jr. | E05B 85/08 70/181 |
| 3,591,218 | A * | 7/1971 | Gowland | E05C 1/06 292/150 |
| 3,791,687 | A * | 2/1974 | Schroeder | E05C 17/56 292/DIG. 15 |
| 3,792,884 | A * | 2/1974 | Tutikawa | E05C 9/047 292/179 |
| 3,834,198 | A * | 9/1974 | Wiczer | E05B 5/003 70/423 |
| 3,993,410 | A * | 11/1976 | Lindsay, Jr. | G05G 1/12 403/71 |
| 4,179,143 | A * | 12/1979 | Shy | E05C 1/04 292/179 |
| 4,699,406 | A * | 10/1987 | Swanson, Jr. | E05B 65/0864 292/DIG. 47 |
| 5,042,854 | A * | 8/1991 | Huang | E05C 1/10 292/163 |
| 5,123,795 | A | 6/1992 | Engel et al. | |
| 5,365,758 | A * | 11/1994 | Shieh | B60R 25/08 70/38 R |
| 5,664,812 | A * | 9/1997 | Marinoni | E05C 17/48 292/153 |
| 5,813,257 | A * | 9/1998 | Claghorn | E05B 47/0012 292/201 |
| 5,975,822 | A * | 11/1999 | Ruff | B64D 11/0696 411/85 |
| 6,299,223 | B1 * | 10/2001 | Ji | E05C 5/02 292/175 |
| 6,895,790 | B2 * | 5/2005 | Jeffries | E05C 1/06 292/DIG. 31 |
| 7,111,658 | B1 * | 9/2006 | Hanna | E04F 10/0648 160/67 |
| 7,431,353 | B1 * | 10/2008 | Huston | E05C 5/02 292/57 |
| 8,752,868 | B2 * | 6/2014 | Kim | E05B 65/0882 292/DIG. 20 |
| 9,098,252 | B2 * | 8/2015 | Sauer | H05K 7/1429 |
| 10,408,434 | B2 * | 9/2019 | Pan | F16B 21/02 |
| 11,015,376 | B2 * | 5/2021 | Rankin, Sr. | E05C 17/48 |
| 2021/0180369 | A1 * | 6/2021 | Nayak | E05B 17/2057 |
| 2023/0003050 | A1 * | 1/2023 | Xiao | E05B 17/226 |

FOREIGN PATENT DOCUMENTS

| | | | | |
|---|---|---|---|---|
| CN | 203627444 U * | 6/2014 | | F16B 5/00 |
| CN | 203822771 U | 9/2014 | | |
| CN | 204113825 U | 1/2015 | | |
| CN | 204140563 U * | 2/2015 | | F16B 5/02 |
| CN | 205158828 U * | 4/2016 | | G09F 9/33 |
| CN | 107403593 A * | 11/2017 | | G09F 9/33 |
| CN | 207718734 U | 8/2018 | | |
| CN | 207909447 U | 9/2018 | | |
| CN | 108915436 A * | 11/2018 | | E05C 17/44 |
| CN | 110081055 A * | 8/2019 | | F16B 21/065 |
| CN | 209729382 U | 12/2019 | | |
| CN | 110701159 A * | 1/2020 | | F16B 5/10 |
| CN | 211599175 U * | 9/2020 | | F16B 5/00 |
| CN | 211878913 U * | 11/2020 | | G09F 9/33 |
| CN | 112185277 A * | 1/2021 | | G09F 9/302 |
| CN | 212360433 U * | 1/2021 | | E05B 17/10 |
| CN | 109712541 B * | 12/2021 | | G09F 3/33 |
| DE | 202005011092 U1 * | 10/2006 | | E05C 1/06 |
| DE | 102007004467 A1 * | 7/2008 | | E05B 65/0864 |
| DE | 102013225594 A1 * | 6/2015 | | E05C 1/06 |
| EC | 203603637 U | 5/2014 | | E05C 1/06 |
| EP | 0755476 B1 * | 4/1999 | | E05B 17/04 |
| FR | 2867499 A1 * | 9/2005 | | E04H 4/082 |
| FR | 2957391 A1 * | 9/2011 | | F16B 21/02 |
| GB | 2170855 A * | 8/1986 | | E05B 65/0864 |
| KR | 810002201 Y1 * | 11/1981 | | E05C 9/00 |
| KR | 19980049785 U * | 10/1998 | | E05B 85/04 |
| KR | 200300464 Y1 * | 1/2003 | | E05C 17/446 |
| KR | 200462949 Y1 | 10/2012 | | |
| NL | 1012724 C2 * | 2/2001 | | E05B 17/2038 |
| WO | WO-2017045265 A1 * | 3/2017 | | G09F 9/33 |
| WO | WO-2021196613 A1 * | 10/2021 | | E05B 17/10 |

OTHER PUBLICATIONS

European Search Report issued in counterpart European Patent Application No. EP 20928492.6, dated Mar. 12, 2024.

International Search Report and Written Opinion issued in corresponding PCT Application No. PCT/CN2020/126636, dated Jan. 27, 2021.

* cited by examiner

LED DISPLAY SCREEN LOCK

CROSS-REFERENCE TO RELATED APPLICATIONS

The present application is a continuation application of International Application No. PCT/CN2020/126636, filed on Nov. 5, 2020, which claims priority to Chinese Patent Application No. 202020483240.2, filed on Apr. 3, 2020 and entitled "LED Display Screen Lock". The disclosures of the aforementioned applications are incorporated in this application by reference in their entireties.

TECHNICAL FIELD

The present application relates to the technical field of locks, and more particularly to a light-emitting diode (LED) display screen lock.

BACKGROUND

The LED display screen usually needs to be locked to a cabinet when being hoisted and assembled. The traditional locks implement locking by clamping a block by a groove. However, it is difficult to assemble the LED display screen when the LED display screen is lifted. For an instance, it will take a lot of efforts to clamp the block into the groove, resulted from factors like angles. Appliance of the common locks to the LED display screen lacks conveniences.

SUMMARY

An objective of embodiments of the present application is to provide an LED display screen lock which can be easily operated.

In order to realize the above objective, the present application provides an LED display screen lock, which includes:
a handle;
a lock seat including a base, a through hole and a pin slidably disposed on the base; and
a lock core rotatably disposed on the handle and in the through hole, where a locking hole is formed on the lock core,
the pin is inserted in the locking hole, an unlocking portion is configured on a circumference of the handle and abutted against the pin for driving the pin to exit the locking hole.

Further, the pin includes a pin rod and a pin cap connected to the pin rod, the unlocking portion is abutted against an end surface of the pin rod, and the pin cap is inserted in the locking hole.

Further, a protect pad is disposed on the end surface of the pin rod and abutted against the unlocking portion.

Further, the unlocking portion includes a notch, and the notch includes a sidewall forming an unlocking surface.

Further, a smooth transition is formed between the unlocking surface and the handle.

Further, the unlocking surface is a slope or a curved surface.

Further, the LED display screen lock includes a first elastic member, and the pin is disposed on the base through the first elastic member.

Further, an accommodation chamber is formed on the base, and the first elastic member and the pin are disposed in the accommodation chamber.

Further, the LED display screen lock includes a cover configured to cover an opening of the accommodation chamber.

Further, the accommodation chamber is communicated with the through hole.

Further, the LED display screen lock includes a groove extended along an axial direction of the lock core, and the locking hole is formed in the groove.

Further, the pin is slidable in the groove.

Further, the locking hole is closer to one end of the groove than to another end of the groove.

Further, a smooth transition is formed between the another end of the groove away from the locking hole and the lock core.

Further, the LED display screen lock includes a second elastic member sleeved on the lock core, an end of the second elastic member is abutted against the lock seat, and another end of the second elastic member is abutted against the handle.

According to the embodiments of the present application, when the LED display screen lock is in the locked state, the pin is locked in the locking hole, and the unlocking portion, which is disposed on the circumference of the handle, is abutted against the pin. The rotating of the handle can drive the pin to exit the locking hole and the unlocking is realized. Thus, all operations in the locking and unlocking of the LED display screen lock of this application are simple and can be accomplished by the operator even with one hand, which provides safeguards to the operator who works high above the ground.

Details of one or more embodiments of the present application are set forth in the attached drawings and descriptions below. Other features and advantages of the present application will become apparent from the description, accompanying drawings and claims.

BRIEF DESCRIPTION OF THE DRAWINGS

In order to more clearly illustrate the embodiments of the present application, drawings used in the embodiments will be briefly described below. Obviously, the drawings in the following description are only some embodiments of the present application. It will be apparent to those skilled in the art that other figures can be obtained according to the structures shown in the drawings without creative work.

DETAILED DESCRIPTION OF THE EMBODIMENTS

In order to explain the technical content, purpose and effect of this application in detail, the description of the embodiments in combination with and the drawings are given below. It can be understood that the embodiments given herein are for illustrative purpose only and are not intended to limit this application.

As shown in FIGS. 1 to 6, an LED display screen lock includes a handle 1, a lock seat 2 and a lock core 3 rotatably disposed on the handle 1. The lock seat 2 includes a base 21, a through hole 22 and a pin 23 slidably disposed in the base 21. The lock core 3 can be disposed in the through hole 22, and a locking hole 4 is formed on the lock core 3 for the pin 23 to be inserted in. An unlocking portion 5 is disposed on a circumference of the handle 1, and configured to abut against the pin 23 to drive the pin 23 to exit the locking hole 4.

According to embodiments of this application, when the LED display screen lock is in a locked state, the pin is interlocked in the locking hole. The unlocking portion, which is disposed on the circumference of the handle, is configured to abut against the pin. As such, the rotating of the handle can drive the pin 23 to exit the locking hole 4, that is, the unlocking of the LED display screen lock is realized.

The working principle of this disclosure is briefly described as follows: the lock core, which is connected to the handle, is passed through the through hole by an operator, and the pin is locked in the locking hole by the operator. As such, the LED display screen lock is in a stably locked state. When the LED display screen lock needs to be unlocked, the handle is rotated, and the unlocking portion on the handle drives the pin to exit from the locking hole, which realizes the unlocking of the LED display screen lock. Hence, according to this application, operating the LED display screen lock is really simple and convenient.

Further, the pin 23 includes a pin rod 24 and a pin cap 25 connected to the pin rod 24. The unlocking portion 5 is abutted against an end surface of the pin rod 24. The pin cap 25 is received in the locking hole 4.

Further, a protect pad 6 is configured on the end surface of the pin rod 24. The unlocking portion 5 is abutted against the protect pad 6.

According to the embodiment of this disclosure, the protect pad 6 can protect the pin 23, and help to reduce the attrition between the unlocking portion 5 and the pin 23.

Further, the unlocking portion 5 includes a notch 51 and an unlocking surface 52 formed in the notch 51. In an embodiment, the unlocking surface 52 is a sidewall of the notch 51. The unlocking surface 52 is a slope or a curved surface.

Further, a smooth transition is formed between the unlocking surface 52 and the handle 1. The connection of the notch 51 with the unlocking surface provides convenience for the handle 1 to switch the state of the LED display screen lock.

Further, the LED display screen lock includes a first elastic member 7. The pin 23 is disposed on the base 21 through the first elastic member 7.

According to the embodiment of this disclosure, the pin 23 can slide in the base 21 though the first elastic member 7 (for example, the pin 23 is slid into the base 21, and then into the locking hole 4, and/or, the pin 23 is slid out of the locking hole 4, and then out of the base 21). The structure thereof is simple, which provides conveniences for the later maintenance.

Furthermore, an accommodation chamber 8 is formed on the base 21, the first elastic member 7 and the pin 23 are received in the accommodation chamber 8. The LED display screen lock further includes a cover 9 for covering an opening of the accommodation chamber 8.

Further, the accommodation chamber 8 is communicated with the through hole 22.

According to the embodiments of the present application, the accommodation chamber 8 is communicated with the through hole 22 and the structure is compact, which helps to reduce the volume of the lock seat 2, and cut down the manufacturing cost of the LED display screen lock.

Furthermore, the LED display screen lock further includes a groove 10 along an axial direction of the lock core 3. The groove 10, which is an elongated hole, is disposed on a surface of the lock core 3. The locking hole 4 is formed in the groove 10, and the pin 23 is slidable in the groove 10.

According to the embodiments of the present application, the sliding of the pin 23 in the groove 10 can maintain the stability of the lock core 3, which provides convenience to lock or unlock.

Furthermore, the locking hole 4 is configured to be close to one end of the groove 10.

According to the embodiment of this disclosure, for the locking hole is close to an end of the groove, when the LED display screen lock needs to be unlocked, it is convenient for the pin 23 to exit along the other end of the groove 10 which is away from the locking hole 4, and avoid that the pin 23 enter the locking hole 4 again and is locked by accident.

Further, the LED display screen lock further includes a second elastic member 11 sleeved on the lock core 3. One end of the second elastic member 11 is configured to abut against the lock seat 2, and the other end of the second elastic member 11 is configured to abut against the handle 1.

According to the embodiments of present application, once the pin exits the locking hole, the handle and the lock core are separated from each other under the action of the second elastic member, which prevents the LED display screen lock from being locked by accident.

Based on the above, when the LED display screen lock is in the locked state, the pin is locked in the locking hole, and the unlocking portion, which is disposed on the circumference of the handle 1, is abutted against the pin. The rotating of the handle can drive the pin to exit the locking hole and the unlocking is realized. Thus, all operations in the locking and unlocking of the LED display screen lock of this application are simple and can be accomplished by the operator even with one hand, which provides safeguards to the operator who works high above the ground.

As shown in FIGS. 1 to 6, an LED display screen lock according to a first embodiment of the present application includes a handle 1, a lock seat 2 and a lock core 3 rotatably disposed on the handle 1. The lock seat 2 includes a base 21, a through hole 22 and a pin 23 slidably disposed on the base 21. The lock core 3 can be disposed in the through hole 22, and a locking hole 4 is formed on the lock core 3 for the pin 23 to be inserted in. An unlocking portion 5 is disposed on a circumference of the handle 1, and can abut against the pin 23 to drive the pin 23 to exit the locking hole 4.

Figure 4:
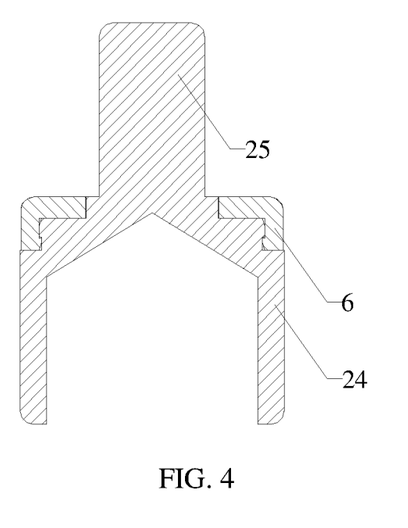
FIG. 4 is a cross-section view of a pin and a protect pad of the LED display screen lock according to the first embodiment of the present application, the pin and the protect pad being assembled together.

As shown in FIG. 4, the pin 23 includes a pin rod 24 and a pin cap 25 connected to the pin rod 24. When the LED display screen lock in a locked state, the unlocking portion 5 is abutted against an end surface of the pin rod 23, and the pin cap 25 is received in the locking hole 4. Specifically, a protect pad 6 is configured on the end surface of the pin rod 24, and the unlocking portion 5 is abutted against the protect pad 6. In an embodiment, the protect pad 6 is made of nylon.

Figure 3:
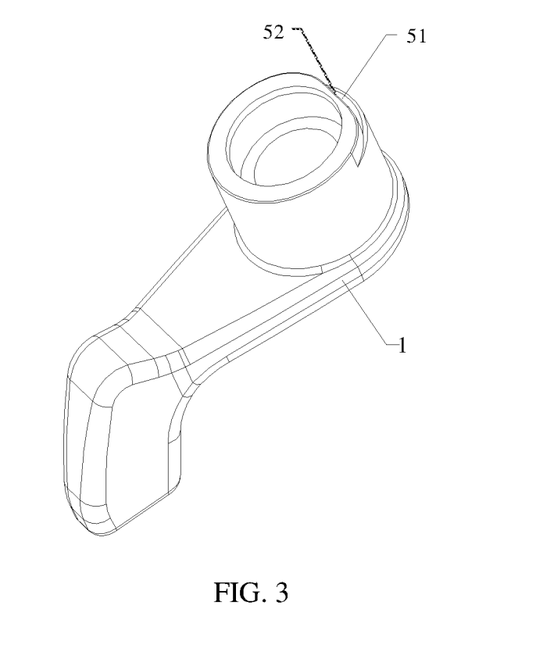
FIG. 3 is a structural view of a handle of the LED display screen lock according to the first embodiment of the perspective application.

In this embodiment, the unlocking portion 5 includes a notch 51 and an unlocking surface 52 formed in the notch 51 and connected with the notch 51. A smooth transition is formed between the unlocking surface and the handle 1. For example, a connecting part (such as a cylindrical bulge)

between the handle 1 and the lock core 3 can maintain stability of the LED display screen lock during an unlocking operation. For example, the unlocking surface 52 is a slope or a curved surface. In an embodiment of the present application, the unlocking surface is a curved surface.

Figure 1:
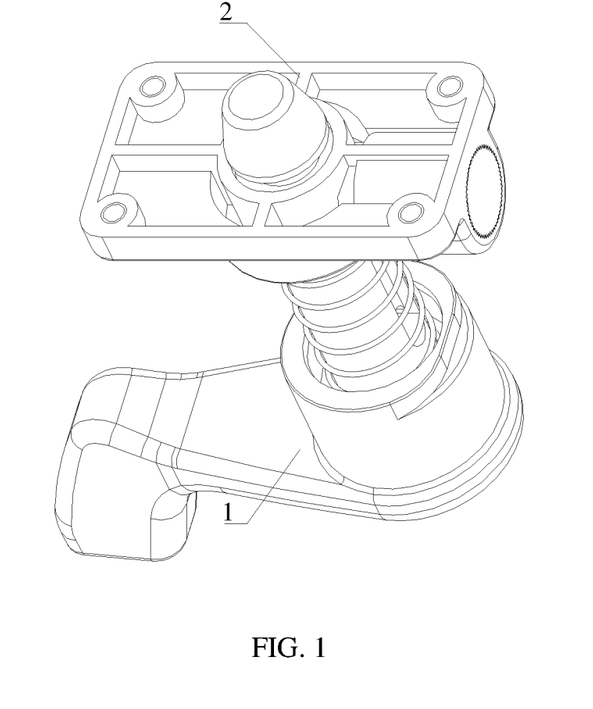
FIG. 1 is a perspective view of an LED display screen lock according to a first embodiment of the present application.
Figure 2:
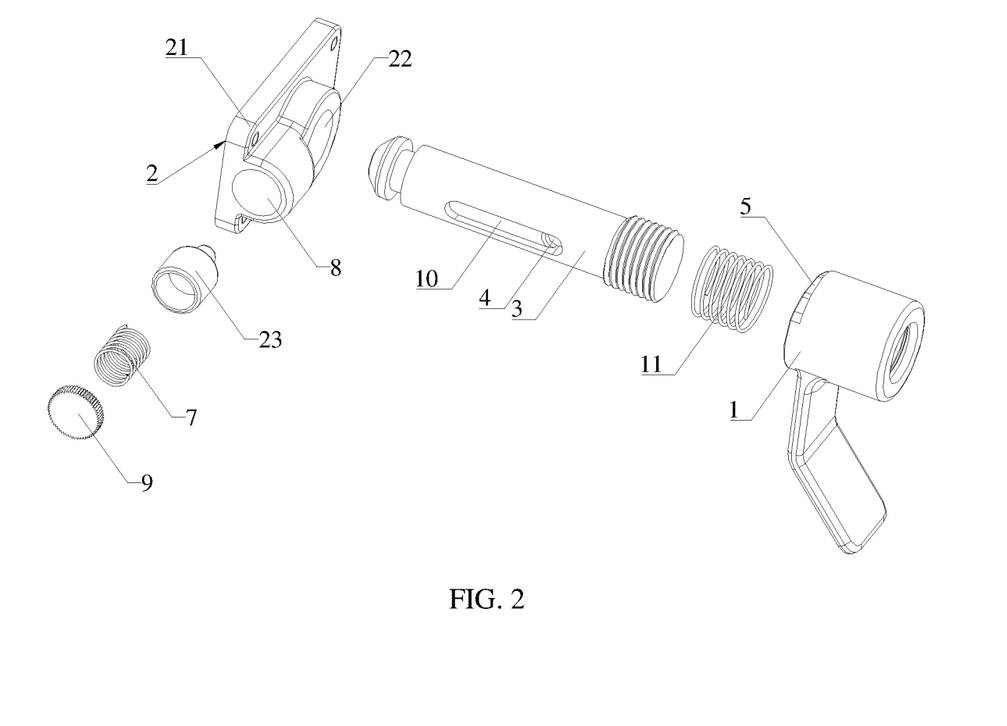
FIG. 2 is an exploded view of the LED display screen lock according to the first embodiment of the present application.

As shown in FIG. 2, an accommodation chamber 8 is formed on the base 21, and the pin 23 is received in the accommodation chamber 8. That is, the pin 23 is disposed on a sidewall of the accommodation chamber 8. Specifically, the accommodation chamber 8 is communicated with the through hole 22. The LED display screen lock further includes an cover 9, to cover an opening of the accommodation chamber 8. In this embodiment, the cover 9 is disposed on the base 21 through a screw.

Optionally, the LED display screen lock further includes a first elastic member 7, and the first elastic member is received in the accommodation chamber 8. The pin 23 is disposed on the base 21 through the first elastic member 7.

Figure 6:
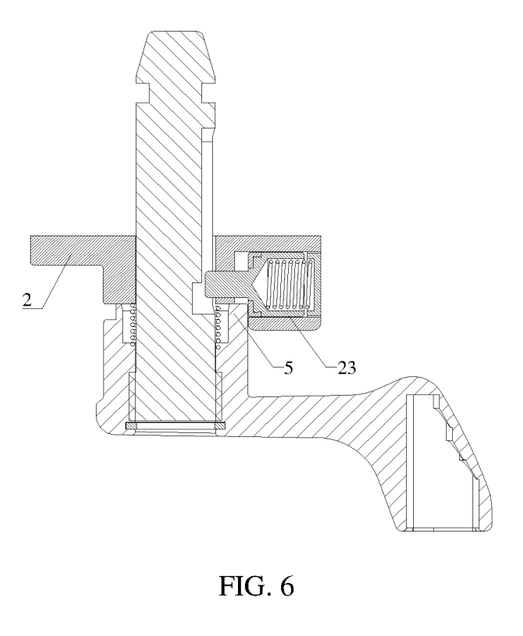
FIG. 6 is a cross-section view of the LED display screen lock in an unlocked state.

The LED display screen lock further includes a groove 10 extended along an axial direction of the lock core 3. The groove 10, which is an elongated hole, is disposed on a surface of the lock core 3. The locking hole 4 is formed in the groove 10, and the pin 23 is slidable in the groove 10. Specially, the locking hole 4 is configured to be close to one end of the groove 10. When to unlock the LED display screen lock, the pin 23 exits from the locking hole 4, and then slides in the groove 10 along the axial direction of the lock core 3 to be away from the locking hole 4 as shown in FIG. 6, which not only enhances the stability, but also prevents the LED display screen lock from being locked again by accident. According to an embodiment of the present application, a smooth transition is formed between the end of the groove 10, which is away from the locking hole 4, and the lock core 3, therefore when the handle 1 and the lock core 3 are took off from the lock seat 2, it is convenient for the pin 23 to exit from the groove 10.

Specially, the LED display screen lock further includes a second elastic member 11, and the second elastic member 11 is sleeved on the lock core 3. One end of the second elastic member 11 abuts against the lock seat 2, and the other end of the second elastic member 11 abut against the handle 1. In an embodiment, the first elastic member 7 and the second elastic member 11 are springs. However, the present applicant is not limited to this, the first elastic member 7 and the second elastic member 11 can be elastic pieces.

Figure 5:
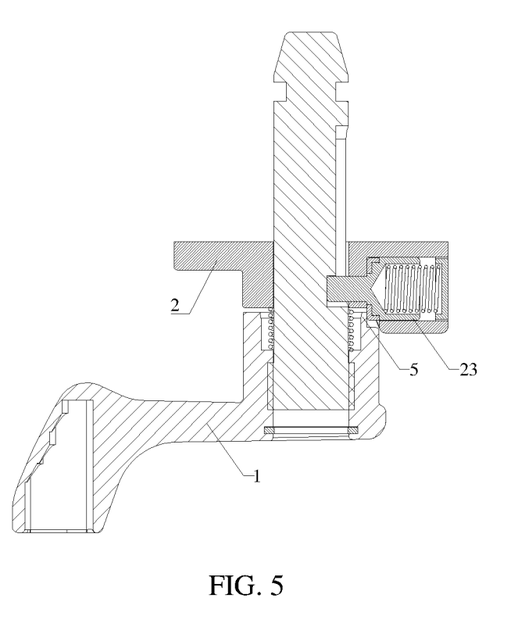
FIG. 5 is a cross-section view of the LED display screen lock in a locked state.

In this embodiment, the working principle of this disclosure is briefly described as follows: when to lock, as shown in FIG. 5, the operator holds the handle and inserts the lock core 3 into the through hole 22 till that the pin cap 25 of the pin 23 enters the locking hole 4. When the LED display screen lock needs to be unlocked, as shown in FIG. 6, for the pin is locked in the locking hole 4, and the unlocking surface 52 of the handle 1 is abutted against the protect pad 6 of the pin rod 24, the handle 1 can be rotated slowly, thereby a thickness of the unlocking portion, where the protect pad 6 is abutted against, gradually increases, to drive the pin 23 to exit from the locking hole 4 until a top of the pin cap 25 is abutted against the groove 10. Thus, the unlocking of the LED display screen lock is completed and then the handle 1 and the lock core 3 can be taken off from the lock seat 2. Optionally, the handle 1 is configured to rotate in a range from 50° to 180°.

Based on the above, according to the LED display screen lock of the present application, the operator can hold the handle and inserts the lock core into the through hole until that the pin cap of the pin enters the locking hole to realize the locking. The operator rotates the handle to make the unlocking surface push the protect pad outwards, so that the pin cap exits the locking hole and the pin exits the locking hole to complete unlocking. In the embodiment of the present application, the protect pad 6 can decrease the abrasion between the unlocking surface 52 and the pin cap 25, and prolong the working life of the LED display screen lock. The second elastic member can separate the handle and the lock seat once the pin exists the locking hole, which prevents the LED display screen lock from being locked by accident.

The above are only embodiments of the present application, and do not limit the scope of the present application. Under the inventive concept of the present application, any equivalent structural transformations made according to the description and drawings of the present application, or any direct/indirect application in other related technical fields are included in the claimed scope of the present application.

What is claimed is:

1. A light-emitting diode (LED) display screen lock, comprising:
   a handle;
   a lock seat comprising a base, a through hole and a pin slidably disposed on the base; and
   a lock core passing through the through hole,
   wherein a locking hole is formed on the lock core, and the handle is configured to rotate around the lock core,
   wherein the pin is inserted in the locking hole, an unlocking portion is configured on a circumference of the handle and abutted against the pin for driving the pin to exit the locking hole,
   the unlocking portion comprises a notch, and the notch comprises a sidewall forming an unlocking surface,
   the unlocking surface is a slope or a curved surface,
   the LED display screen lock further comprises a second elastic member sleeved on the lock core, wherein:
   an end of the second elastic member is abutted against the lock seat; and
   another end of the second elastic member is abutted against the handle.

2. The LED display screen lock of claim 1, wherein:
   the pin comprises a pin rod and a pin cap connected to the pin rod;
   the unlocking portion is abutted against an end surface of the pin rod; and
   the pin cap is inserted in the locking hole.

3. The LED display screen lock of claim 2, wherein a protect pad is disposed on the end surface of the pin rod and abutted against the unlocking portion.

4. The LED display screen lock of claim 1, wherein a smooth transition is formed between the unlocking surface and the handle.

5. The LED display screen lock of claim 1, further comprising a first elastic member, wherein the pin is disposed on the base through the first elastic member.

6. The LED display screen lock of claim 5, wherein an accommodation chamber is formed on the base, and the first elastic member and the pin are disposed in the accommodation chamber.

7. The LED display screen lock of claim 6, further comprising a cover configured to cover an opening of the accommodation chamber.

8. The LED display screen lock of claim 6, wherein the accommodation chamber is communicated with the through hole.

9. The LED display screen lock of claim 1, further comprising a groove extended along an axial direction of the lock core, wherein the locking hole is formed in the groove.

10. The LED display screen lock of claim 9, wherein the pin is slidable in the groove.

11. The LED display screen lock of claim 9, wherein the locking hole is closer to one end of the groove than to another end of the groove.

12. The LED display screen lock of claim 9, wherein a smooth transition is formed between an end of the groove away from the locking hole and the lock core.

\* \* \* \* \*